(No Model.)
W. W. ALLEN.
SAFETY BRAKE FOR CARS.
No. 455,296. Patented July 7, 1891.
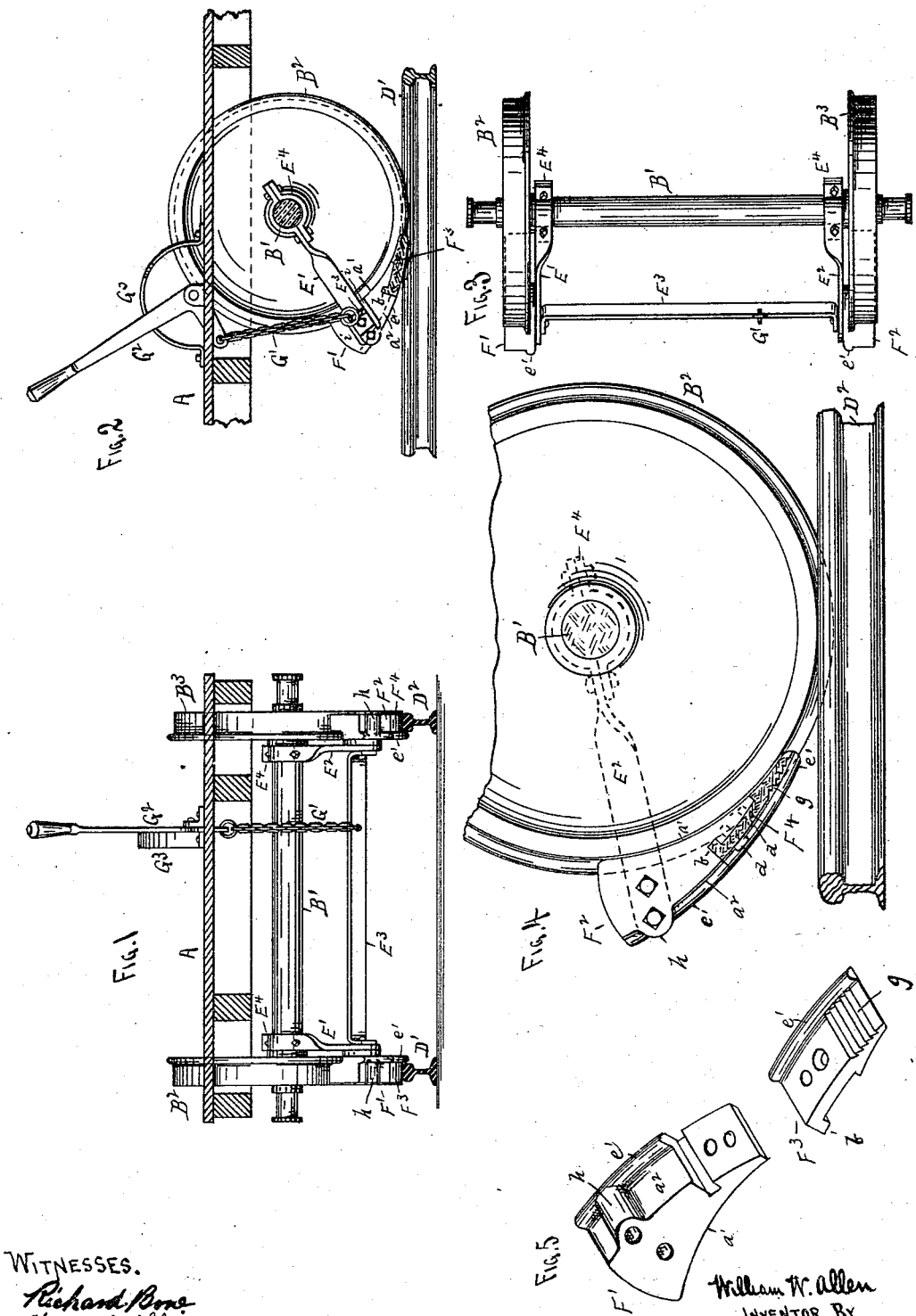
Witnesses.
Richard Bone
Hew Muller
William W. Allen
INVENTOR. BY
Charles H. Woodward atty.

United States Patent Office.

WILLIAM W. ALLEN, OF ST. PAUL, MINNESOTA.

SAFETY-BRAKE FOR CARS.

SPECIFICATION forming part of Letters Patent No. 455,296, dated July 7, 1891.

Application filed March 31, 1891. Serial No. 387,135. (No model.)

*To all whom it may concern:*

Be it known that I, WILLIAM W. ALLEN, a citizen of the United States, residing at St. Paul, in the county of Ramsey and State of Minnesota, have invented certain new and useful Improvements in Safety-Brakes for Street and other Cars, of which the following is a specification.

This invention relates to safety-brakes for street and other cars; and it consists in the construction and arrangement of parts, as hereinafter shown and described, and specifically pointed out in the claims.

In the drawings, Figure 1 is a cross-sectional elevation, Fig. 2 is a longitudinal sectional elevation, and Fig. 3 is a plan view, of a portion of a car-truck, showing my improved brake attached to a pair of the wheels thereof. Fig. 4 is an enlarged detail of one of the wheels from the outside, showing one of the brake-shoes connected thereto. Fig. 5 is a perspective view of the two parts of one of the brake-shoes detached and reversed.

A represents a portion of the platform or frame of a car; $B'$, one of the axles; $B^2$ $B^3$, a pair of the wheels, and $D'$ $D^2$ the rails, all these parts being of the usual construction.

Swinging from the axle $B'$ by bars $E'$ $E^2$ are two shoes $F'$ $F^2$, the faces $a'$ next the treads of the wheels being concentric therewith, and the outer faces $a^2$ being eccentric to the treads and curved, as shown. The shoes are thus wedge-shaped, and being rigidly connected to the bars $E'$ $E^2$ are held at all times in the same relative position with relation to the axle, which is an important feature of the invention, as the shoes are thereby prevented from "rolling" beneath the wheels or getting out of place with relation to the wheels. The bars $E'$ $E^2$ are connected by cross-bar $E^3$, from which a chain $G'$ leads up to a bell-crank hand-lever $G^2$, pivoted on the deck A of the car, by which means the shoes may be held up out of the way when not in use.

Any simple means may be employed to hold the lever $G^2$ in its backward position, such as a notched segment $G^3$; but it must be of such a nature that while firmly holding the lever in place it will permit it to be instantly released in cases of emergency. The "toes" of the brake-shoes will be strengthened by steel plates $F^3$ $F^4$, the rear ends of the toes being provided with ribs $b$, fitting up into corresponding cavities in the main part of the shoes, so that the whole strain will not be borne by the bolts $d$, by which the toe-plates are secured to the shoes. Each of the shoes and also the toe-plates will be supplied with ribs $e'$ to project down inside the rails and prevent the shoes being thrown from the track sidewise, as hereinafter more fully shown. Formed across the lower surface of the toe-plates are grooves $g$, forming teeth or sharp ribs which catch upon the rails and prevent the shoes sliding thereon. Across the rear under side of each shoe is a rib $h$ to form stops to the shoes when in action to limit the movement and prevent them turning too far over, as hereinafter set forth. The bars $E'$ $E^2$ may be formed and connected to the axle in any desired manner, but simple straps formed to partially encompass the axle and held thereon by cap-straps $E^4$ form a very simple and effective means of attachment. The bars $E'$ $E^2$ after leaving the axle are twisted and are secured flatwise against the inner sides of the shoes, being strengthened in their contact by ribs $i$ upon the shoes, which assist in holding them in place. The rear bolts $d$ by which the toe-plates are secured to the shoes will preferably be left with their heads projecting to serve as stops to retard the backward movement of the shoes and prevent them turning over too far backward.

The operation is very simple and is as follows: So long as the car is running regularly and the ordinary brakes are sufficient to hold it the safety-brake will not be required; but in event of any accident, an obstruction on the track, or the failure of the ordinary brakes, especially in running down heavy grades, then by merely releasing the handle $G^2$ the shoes $F'$ $F^2$ will fall of their own volition and the toe-plates will be inserted between the rails $D'$ $D^2$ and treads of the wheels $B^2$ $B^3$, as shown in Fig. 2. The momentum of the car will cause the wheels to "ride" upon the shoes, (the curved form of the bottom faces $a^2$ insuring this,) so that the whole end of the car supported by the axle to which the shoes are connected will be lifted and its weight transferred to the shoes, which catch by the teeth $g$ into the rails and at once stop the car. As soon as the car is stopped it at once rocks back again upon the curved shoes and returns to its former position, releasing the shoes, which will then be elevated again by the handle $G^2$ ready for the next occasion when they will be required. When used under ordinary conditions, the momentum of the car will not be sufficient to "rock" the shoes far enough to bring the bolt-heads $d$ in contact with the track; but when that does take place the bolt-heads are very effective in limiting the backward rocking movement of the shoes. Under greater momentum, or when running down heavy grades, the rocking motion might be sufficient to overcome the obstruction offered by the bolt-heads, and in that event the ribs $h$ will come into action and effectually prevent the rocking motion being sufficient to entirely overbalance the shoes.

Having thus described my invention, what I claim as new is—

1. A brake-shoe formed with one side concentric to and adapted to fit the tread of the wheel and with the other side eccentric to the tread of the wheel and adapted to come in contact with the rails and connected rigidly to bars $E'$ $E^2$, which bars are journaled by their other ends upon the axle, whereby when said shoes are in action they retain the same relative position with relation to the wheels and axle, substantially as and for the purpose set forth.

2. A brake-shoe formed with one side concentric to and adapted to fit the tread of the wheel and with the other side eccentric to the tread of the wheel and adapted to come in contact with the rails, and removable toe-plates attached to said shoes and provided with teeth $g$, arranged and operated substantially as and for the purpose set forth.

In testimony whereof I have hereunto set my hand in the presence of two subscribing witnesses.

WILLIAM W. ALLEN.

Witnesses:
C. N. WOODWARD,
H. S. WEBSTER.